US006422601B1

(12) United States Patent
Quioc

(10) Patent No.: US 6,422,601 B1
(45) Date of Patent: Jul. 23, 2002

(54) DUAL CHAMBER INFLATOR

(75) Inventor: Eduardo Quioc, Westland, MI (US)

(73) Assignee: Automotive Systems Laboratory, Inc., Farmington Hills, MI (US)

( * ) Notice: Subject to any disclaimer, the term of this patent is extended or adjusted under 35 U.S.C. 154(b) by 0 days.

(21) Appl. No.: 09/568,719

(22) Filed: May 11, 2000

Related U.S. Application Data

(60) Provisional application No. 60/133,631, filed on May 11, 1999.

(51) Int. Cl.$^7$ .............................................. B60R 21/26
(52) U.S. Cl. ...................................... 280/741; 280/736
(58) Field of Search ............................. 280/736, 741, 280/742; 102/530, 531

(56) References Cited

U.S. PATENT DOCUMENTS

| | | | |
|---|---|---|---|
| 4,530,516 A | 7/1985 | Adams et al. ............... | 280/741 |
| 4,944,527 A | 7/1990 | Bishop et al. ............... | 280/741 |
| 4,950,458 A | 8/1990 | Cunningham ............... | 422/164 |
| 5,400,487 A | 3/1995 | Gioutsos et al. ............ | 280/735 |
| 5,547,217 A | 8/1996 | Zelenak et al. ............. | 280/741 |
| 5,558,367 A | 9/1996 | Cuevas ....................... | 280/737 |
| 5,564,743 A | 10/1996 | Marchant .................... | 280/741 |
| 5,566,976 A | 10/1996 | Cuevas ....................... | 280/737 |
| 5,611,566 A | 3/1997 | Simon et al. ................ | 280/736 |
| 5,613,705 A | 3/1997 | Hock et al. ................. | 280/741 |
| 5,622,380 A | 4/1997 | Khandhadia et al. ....... | 280/736 |
| 5,628,528 A | 5/1997 | DeSautelle et al. ......... | 280/736 |
| 5,658,010 A | 8/1997 | Steffens, Jr. et al. ........ | 280/741 |
| 5,690,357 A * | 11/1997 | Cuevas ....................... | 280/737 |
| 5,794,973 A | 8/1998 | O'Loughlin et al. ........ | 280/737 |
| 5,799,973 A | 9/1998 | Bauer et al. ................. | 280/741 |
| 5,851,027 A | 12/1998 | DiGiacomo et al. ........ | 280/736 |
| 5,934,705 A | 8/1999 | Siddiqui et al. ............. | 280/736 |
| 6,019,389 A | 2/2000 | Burgi et al. ................. | 280/736 |
| 6,032,979 A | 3/2000 | Mossi et al. ................. | 280/741 |
| 6,068,291 A * | 5/2000 | Lebaudy et al. ............. | 280/736 |
| 6,095,556 A | 8/2000 | Bailey et al. ................ | 280/737 |
| 6,095,561 A | 8/2000 | Siddiqui et al. ............. | 280/742 |
| 6,149,193 A | 11/2000 | Canterberry et al. ........ | 280/741 |
| 6,206,414 B1 * | 3/2001 | Cook et al. .................. | 280/734 |
| 6,286,863 B1 * | 9/2001 | Kamiji et al. ............... | 280/736 |
| 6,299,203 B1 * | 10/2001 | Muller ........................ | 280/736 |
| 6,315,322 B1 * | 11/2001 | Mika ........................... | 280/736 |

FOREIGN PATENT DOCUMENTS

DE       42 27 547 A1     2/1994

OTHER PUBLICATIONS

WO 98/39183; Title: Multi–Chamber Inflator; International Publication Date Sep. 11, 1998; Inventors: Shahid A. Siddiqui and Rickey Lee Stratton; Applicant: Automotive Systems Laboratory, Inc.

* cited by examiner

Primary Examiner—J. J. Swann
Assistant Examiner—David R. Dunn
(74) Attorney, Agent, or Firm—Dinnin & Dunn, P.C.

(57) ABSTRACT

A dual chamber inflator 10 utilizes a housing 12 having two combustion chambers 14 and 16, respectively contained within a monolithic body 18. A partition 32 integral to the monolithic body 18 and centrally disposed thereof, forms two discrete propellant chambers 14 and 16 in fluid communication with the housing 12.

6 Claims, 1 Drawing Sheet

DUAL CHAMBER INFLATOR

CROSS-REFERENCE TO RELATED APPLICATIONS

This application claims the benefit of provisional application Ser. No. 60/133,631 filed on May 11, 1999.

BACKGROUND OF THE INVENTION

The present invention relates to gas generators, used to inflate air bags in a vehicle occupant protection system for example, and more particularly, to an improved dual chamber gas generator containing an improved structure for isolating the propellant chambers of a dual chamber inflator so as to ensure proper deployment of the airbag.

Inflation systems for deploying an air bag in a motor vehicle generally employ a single gas generator in fluid communication with an uninflated air bag. A firing circuit typically triggers the gas generator when the sensed vehicle acceleration exceeds a predetermined threshold value, as through the use of an acceleration-responsive inertial switch.

However, air bag inflation systems utilizing a single gas generator suffer from the disadvantage that the onset pressurization/inflation rate is generally set to provide aggressive initial inflation in order to achieve a particular inflation time related to occupant position. An aggressive onset rate of pressurization becomes problematic in situations where the occupant is out of position. More specifically, rapid onset pressurization of the air bag can cause the air bag to impact against the occupant with enough force to injure the occupant. The airbag volume and inflating capacity are designed to protect both large and small occupants and are generally not variable within the single gas generator. Occasionally, when an air bag utilizing a single gas generator is deployed, smaller occupants, usually children and smaller women, have been seriously injured.

Commonly owned U.S. Pat. No. 5,400,487 discloses an inflation system which overcomes the above problem by utilizing a plurality of gas generators which are controllably ignited to provide a variable inflation profile which can be tailored to any given occupant weight and/or position and for any crash type. While this arrangement dramatically improves the inflation system's ability to protect an occupant, it does so at significant expense and complexity. The multiple gas generators and squibs add considerable cost to the system, while the firing control circuitry requires sophisticated processors capable of accurately timing the various ignition profiles.

Another proposal, as taught in commonly owned U.S. Pat. No. 5,934,705, is a gas generator having two chambers in a single housing defined by a mechanically retained wall between the ends thereof. Each housing is of a predetermined size that is determinative of the propellant capacity and consequently, of the inflating capability of each chamber. Upon the occurrence of a vehicle collision, depending on the weight of the passenger, either chamber or both may be selectively ignited thereby inflating the protective airbag. However, the structural integrity of such a known dual chamber inflator, may be compromised by failure of the wall separating the chambers when only one chamber is fired.

Therefore, a need exists for a dual chamber gas generator which can produce selective air bag inflation pressurization yet prevent hazardous structural failure of the gas generator.

SUMMARY OF THE INVENTION

Complete isolation of the chambers of a dual chamber airbag inflator is critical to soft deployment of the airbag. Accordingly, the present invention relates to an improved structure for isolating the propellant chambers of a dual chamber inflator so as to insure proper deployment. Specifically, a cup shaped impact extrusion having a central partition, is employed to define the dual chambers of the inflator and positively isolate the propellants therein.

The impact extrusion is a structural component of the inflator pressure vessel. The inflator can be configured to ignite the propellants in the dual chambers simultaneously or with a delay between ignition depending on the severity of the crash.

DETAILED DESCRIPTION OF THE PREFERRED EMBODIMENT OF THE INVENTION

Figure 1:
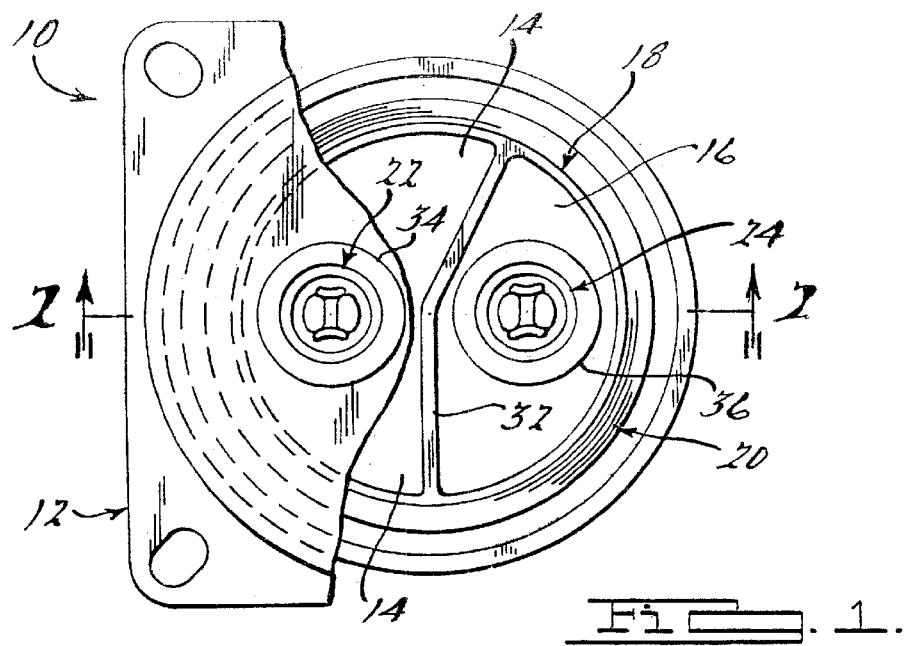
FIG. 1 is a top view, partially in cross-section, of a two-chamber inflator in accordance with the present invention.
Figure 2:
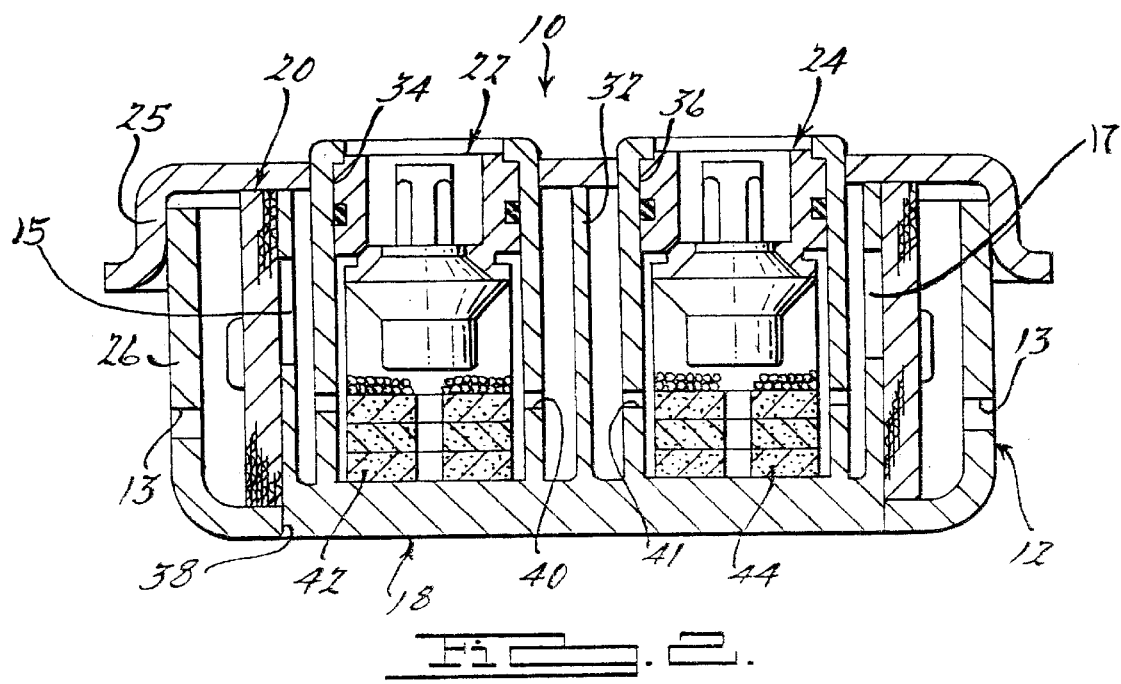
FIG. 2 is a cross-sectional view taken along the line 2—2 of FIG. 1.

As seen in FIG. 1 of the drawing, an inflator 10, in accordance with a preferred embodiment of the present invention, comprises a housing 12, propellant chambers 14 and 16 defined by an impact extrusion 18, disposed centrally of the housing 12, an annular filter 20 and a pair of igniters 22 and 24.

The inflator housing 12 is formed by bonding or welding two sections 25 and 26 to one another in nested relationship. The lower housing portion 26 contains an aperture 38 for the acceptance or coupling of the impact extrusion 18. In general, extrusion 18 is welded to housing 12 at aperture 38. The extrusion 18 is provided with an integral centrally disposed partition 32 and a pair of igniter and propellant support tubes 34 and 36 for the support of the igniters 22 and 24, respectively. The igniter tubes 34 and 36 are welded to section 25, and are provided with a plurality of gas discharge apertures 40 and 41 disposed in a circumferential array at points radially aligned with propellant grains 42 and 44, respectively.

The filter 20 comprises a fine wire mesh annulus that is resiliently axially compressed between the housing sections 25 and 26 upon assembly thereof. The filter 20 is radially positioned between the extrusion 18 and an inner wall of the housing 12.

Given that other known manufacturing methods are contemplated, impact extrusion 18 is also characterized as a monolithic body or a cupshaped structure. In essence, the various structural features of the extrusion 18 are integrated within a unified structure thereby enhancing the strength and operability of the inflator 10.

Stated another way, a cup-shaped structure 18 has a plurality of partitions integral thereto, including a first igniter tube 34 and a second igniter tube 36, and, a partition 32 centrally disposed within the housing 12. Tubes 34 and 36 are provided for the acceptance of igniters 22 and 24, respectively. Partition 32 separates structure 18 into two discrete propellant chambers 14 and 16, each chamber comprising at least one aperture 15 and 17, respectively. Thus, when propellants 42 and 44 are ignited, co-mingling of the resulting combustion gases is prevented and heat transfer is inhibited between the two chambers. When selected, sequential operation rather than simultaneous operation of the two chambers is thereby ensured.

In operation, chambers 14 and 16 are configured to ignite simultaneously or sequentially depending on the input from the vehicle crash sensing system. Combustion gas flows radially outwardly from propellant chambers 14 and 16, then through filter 20 thence exiting the inflator 10 through the plurality of apertures 13 in the housing 12. The wire mesh filter 20 can be formed from multiple layers or wraps of metal screen, for example. Although not limited thereby, U.S. Pat. No. 6,032,979, herein incorporated by reference, illustrates a typical metal filter.

It will be understood that the foregoing description of the preferred embodiment of the present invention is for illustrative purposes only. For example, the propellants 42 and 44 may alternatively be contained within the chambers 14 and 16, respectively. As such, the various structural and operational features herein disclosed are susceptible to a number of modifications, none of which departs from the spirit and scope of the present invention as defined in the appended claims.

What is claimed is:

1. A gas generator comprising:

a housing comprising a first plurality of apertures spaced therein;

a cup-shaped body fluidly communicating with and coupled to said housing;

a plurality of partitions contained within said housing and integral to said cup-shaped body, wherein, a first integral partition forms a first igniter support having a second plurality of apertures spaced therein, a second integral partition forms a second igniter support having a third plurality of apertures spaced therein, and a third integral partition forms a discrete first propellant chamber and a discrete second propellant chamber, said first and second igniter supports fluidly communicating with and separately contained within said first and second propellant chambers, respectively;

a first propellant within said first igniter support;

a second propellant within said second igniter support;

a first igniter contained by said first igniter support; and a second igniter contained by said first igniter support.

2. The gas generator of claim 1 further comprising an annular filter fluidly communicating with and radially spaced about said cup-shaped body and within said housing.

3. A gas generator comprising:

a housing comprising a first plurality of apertures spaced therein;

a monolithic body fluidly communicating with and coupled to said housing;

a plurality of partitions contained within said housing and integral to said monolithic body, wherein a first integral partition forms a first igniter support having a second plurality of apertures spaced therein, a second integral partition forms a second igniter support having a third plurality of apertures spaced therein, and a third integral partition forms a discrete first propellant chamber and a discrete second propellant chamber, said first and second igniter supports fluidly communicating with and separately contained within said first and second propellant chambers, respectively;

a first propellant within said first igniter support;

a second propellant within said second igniter support;

a first igniter contained by said first igniter support; and a second igniter contained by said first igniter support.

4. The gas generator of claim 3 further comprising an annular filter fluidly communicating with and radially spaced about said monolithic body and within said housing.

5. A gas generator comprising:

a housing comprising a first plurality of apertures spaced therein;

an impact extrusion fluidly communicating with and coupled to said housing;

a plurality of partitions contained within said housing and integral to said impact extrusion, wherein a first integral partition forms a first igniter support having a second plurality of apertures spaced therein, a second integral partition forms a second igniter support having a third plurality of apertures spaced therein, and a third integral partition forms a discrete first propellant chamber and a discrete second propellant chamber, said first and second igniter supports separately contained within said first and second propellant chambers, respectively;

a first propellant within said first igniter support;

a second propellant within said second igniter support;

a first igniter contained by said first igniter support; and a second igniter contained by said first igniter support.

6. The gas generator of claim 5 further comprising an annular filter fluidly communicating with and radially spaced about said monolithic body and within said housing.

* * * * *

UNITED STATES PATENT AND TRADEMARK OFFICE
CERTIFICATE OF CORRECTION

PATENT NO. : 6,422,601 B1
DATED : July 23, 2002
INVENTOR(S) : Eduardo Quioc

It is certified that error appears in the above-identified patent and that said Letters Patent is hereby corrected as shown below:

Column 3,
Line 40, should read: -- a second igniter contained by said second igniter support. --

Column 4,
Line 17, should read: -- a second igniter contained by said second igniter support. --
Line 41, should read: -- a second igniter contained by said second igniter support. --

Signed and Sealed this

Fifth Day of November, 2002

*Attest:*

*Attesting Officer*

JAMES E. ROGAN
*Director of the United States Patent and Trademark Office*

UNITED STATES PATENT AND TRADEMARK OFFICE
CERTIFICATE OF CORRECTION

PATENT NO. : 6,422,601 B1
DATED : July 23, 2002
INVENTOR(S) : Eduardo Quioc

It is certified that error appears in the above-identified patent and that said Letters Patent is hereby corrected as shown below:

Column 4,
Line 39, should read -- a second igniter contained by said second igniter support. --
Line 41, should read -- annular filter fluidly communicating with and radially --

Signed and Sealed this

Twenty-fifth Day of March, 2003

JAMES E. ROGAN
*Director of the United States Patent and Trademark Office*